United States Patent [19]
Catto

[11] Patent Number: 6,139,326
[45] Date of Patent: Oct. 31, 2000

[54] METHOD AND TESTING INSTRUMENT FOR ASSESSING SKILLS OF AN INDIVIDUAL

[76] Inventor: Loretta Catto, 3330 Cumberland, Olympia Fields, Ill. 60461

[21] Appl. No.: 09/174,221

[22] Filed: Oct. 16, 1998

[51] Int. Cl.⁷ .............. G09B 1/00; G09B 19/00
[52] U.S. Cl. .............. 434/167; 434/159; 434/17; 434/347; 273/296; 273/299; 273/307; 273/308; 283/46
[58] Field of Search .................. 434/322, 327, 434/345, 346, 347, 159, 167, 170, 172, 176; 273/296, 299, 307, 308; 283/46

[56] References Cited

U.S. PATENT DOCUMENTS

| | | | |
|---|---|---|---|
| D. 56,985 | 1/1921 | Moore | D21/381 |
| 328,766 | 10/1885 | Dewey . | |
| 565,797 | 8/1896 | Roller . | |
| 741,903 | 10/1903 | Gates . | |
| 850,150 | 4/1907 | Glazier . | |
| 1,509,371 | 9/1924 | Nalle . | |
| 1,525,696 | 2/1925 | Spencer . | |
| 1,538,529 | 5/1925 | Troidl . | |
| 1,565,901 | 12/1925 | Brandt . | |
| 1,587,026 | 6/1926 | Nalle . | |
| 1,641,982 | 9/1927 | McDade . | |
| 1,666,337 | 4/1928 | McDade . | |
| 1,728,491 | 9/1929 | Janneson . | |
| 1,732,815 | 10/1929 | Knight . | |
| 1,989,599 | 1/1935 | Lipschitz et al. | 273/1 |
| 2,145,794 | 1/1939 | Huber | 46/34 |
| 2,171,873 | 9/1939 | Gould | 235/89 |
| 2,178,906 | 11/1939 | Haumerson | 35/74 |
| 2,317,206 | 4/1943 | Major | 35/31 |
| 2,339,074 | 1/1944 | Hogan | 273/157 |
| 2,377,100 | 5/1945 | Patterson | 35/22 |
| 2,659,163 | 11/1953 | Albee | 35/8 |
| 2,693,646 | 11/1954 | Hawkins | 35/9 |
| 2,863,226 | 12/1958 | Kelly | 35/9 |
| 2,881,662 | 4/1959 | Harris | 88/79 |
| 2,982,032 | 5/1961 | Cooke | 35/75 |
| 3,081,560 | 3/1963 | Aguid | 35/35 |
| 3,152,403 | 10/1964 | Betz | 35/9 |
| 3,172,214 | 3/1965 | Aberge et al. | 35/8 |
| 3,206,872 | 9/1965 | Nason et al. | 35/31 |
| 3,224,112 | 12/1965 | Hanson | 35/9 |
| 3,374,559 | 3/1968 | Smith, Jr. | 35/31 |
| 3,435,541 | 4/1969 | Tacey | 35/31 |
| 3,491,193 | 1/1970 | Bianchi | 35/9 |
| 3,755,921 | 9/1973 | Heller | 35/22 R |
| 3,789,517 | 2/1974 | Romstad | 35/9 E |
| 3,874,096 | 4/1975 | Romstad | 35/31 E |
| 5,772,212 | 6/1998 | Hagedorn | 273/299 |

OTHER PUBLICATIONS

K–Seals: Alan and Nadeen Kaufman. pp. 1–14 and pp. 1–9. Mar. 1993.

*Primary Examiner*—Robert A. Hafer
*Assistant Examiner*—Bera Miller
*Attorney, Agent, or Firm*—Baniak Nicholas Pine & Gannon

[57] ABSTRACT

A method for assessing the readiness skills of a child between the ages of two and six years is disclosed. To assess the child's skills, a set of specially designed cards is provided. Each card displays one or more predetermined symbols. The cards are displayed to the child according to a predefined protocol. As the cards are displayed, a testing specialist asks the child questions about each card and records the child's responses. The child's responses are then scored to assess his or her skill level. The cards are organized into color-coded subsets. Each subset can be used to test a child's mastery of a certain task. In addition, the cards can be asymmetrically-shaped to facilitate sorting and presentation. The unique design of the cards permits the testing specialist to quickly screen young children with possible learning disabilities.

10 Claims, 5 Drawing Sheets

METHOD AND TESTING INSTRUMENT FOR ASSESSING SKILLS OF AN INDIVIDUAL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates generally to methods of testing individuals, and in particular, to an improved method for quickly assessing individual skill levels using a set of specially designed cards.

BACKGROUND OF THE INVENTION

Skill testing involves presenting one or more tasks to an individual and then assessing his/her ability to perform those tasks. Skills that are frequently tested include academic skills, such as reading, writing, and mathematics, as well as mental and physical skills, such as memorization, manual dexterity, and the like. Skill tests are often administered to identify children that may be experiencing learning problems. Typically, a child experiencing problems is identified at an early age by parents or teachers. The child is then referred to a testing specialist, such as a child psychologist or special education teacher, who administers a screening test to ascertain the child's mastery of certain pre-academic/academic skills, collectively known as readiness skills. Readiness skills are generally those skills that a child should learn during their first few years in school to insure a healthy educational environment. Readiness skills include, but are not limited to, the ability to recognize and name letters, numbers and shapes, to correctly perform simple comparisons, and in some cases, to form simple words.

Conventional techniques for testing readiness skills include interactive evaluation sessions, where a testing specialist orally presents a series of tasks to the child. In performing readiness skills tests, it is important that the child is not distracted or confused by the format of the test. The purpose of the test is to ascertain the child's mastery of certain basic concepts and knowledge. Accordingly, interactive testing sessions offer significant advantage over other forms of testing, such as standardized written examinations, because they permit the examiner to adjust the examination to the examinee, thus resulting in a more accurate assessment.

Interactive evaluation sessions frequently involve the use of testing instruments for presenting information, such as chalk boards, easels, pencil-and-paper, or the like.

However, conventional testing instruments present serious limitations when attempting to assess the readiness skills of young children. For example, presenting test information on a chalkboard or easel is not only awkward, but is often confusing and intimidating for some children. Furthermore, chalkboards and easels restrict the child's ability to handle and manipulate the test instrument. Involvement of the child with test instruments is important because it permits the examiner to observe the child's reaction and response to test stimuli. Using a simple pencil-and-paper approach to present information can be time-consuming. Moreover, it may not be appropriate for younger children who may not be able to perform using a written format. Accordingly, current techniques for assessing readiness skills are time-consuming and limited when applied to young children.

Therefore, there is a need for an improved method and testing instrument for evaluating pre-academic skills in young children.

SUMMARY OF THE INVENTION

It is an advantage of the present invention to provide a method and testing instrument for quickly screening children to determine whether they are at risk for learning difficulties. A further advantage of the invention is that the testing instrument permits an examiner to adaptively present information to young children in an interactive manner that is appropriate for their age-level.

According to one aspect of the present invention, a method is provided for assessing the readiness skills of a child. The child can be between the ages of three and six years. To assess the child's skills, a set of specially designed cards is provided. Each card displays one or more predetermined symbols. The cards are displayed to the child according to a pre-defined protocol. As the cards are displayed, a testing specialist asks the child questions about each card and records the child's responses. The child's responses are then scored to assess his/her skill level.

According to another aspect of the present invention, a testing kit can include a set of specially designed cards, provided as a testing instrument. The front side of each card displays a letter or number. In addition, the cards are organized into color-coded subsets, which greatly improves the convenience with which the cards may be used. Each subset designates a particular task(s) to be tested. A first subset displays a first group of letters on the front side. At least one of the cards in the first subset displays on its backside a letter from the first group. A second subset of cards displays a second group of letters on the front side, while at least one card of the second subset displays a word on its backside. The word is composed of letters from the second group. A third subset of cards displays various shapes on the backside, and a fourth subset displays columns having various lengths on the backsides. A fifth subset of cards displays a repeated symbol on the backsides. The repeated symbol can appear in various quantities, colors, shapes and sizes.

BRIEF DESCRIPTION OF THE DRAWINGS

The invention is pointed out with particularity in the appended claims. However, other features of the invention will become more apparent, and the invention will be best understood by referring to the following specification and accompanying drawings, in which:

DETAILED DESCRIPTION OF THE EMBODIMENT

Figure 1:
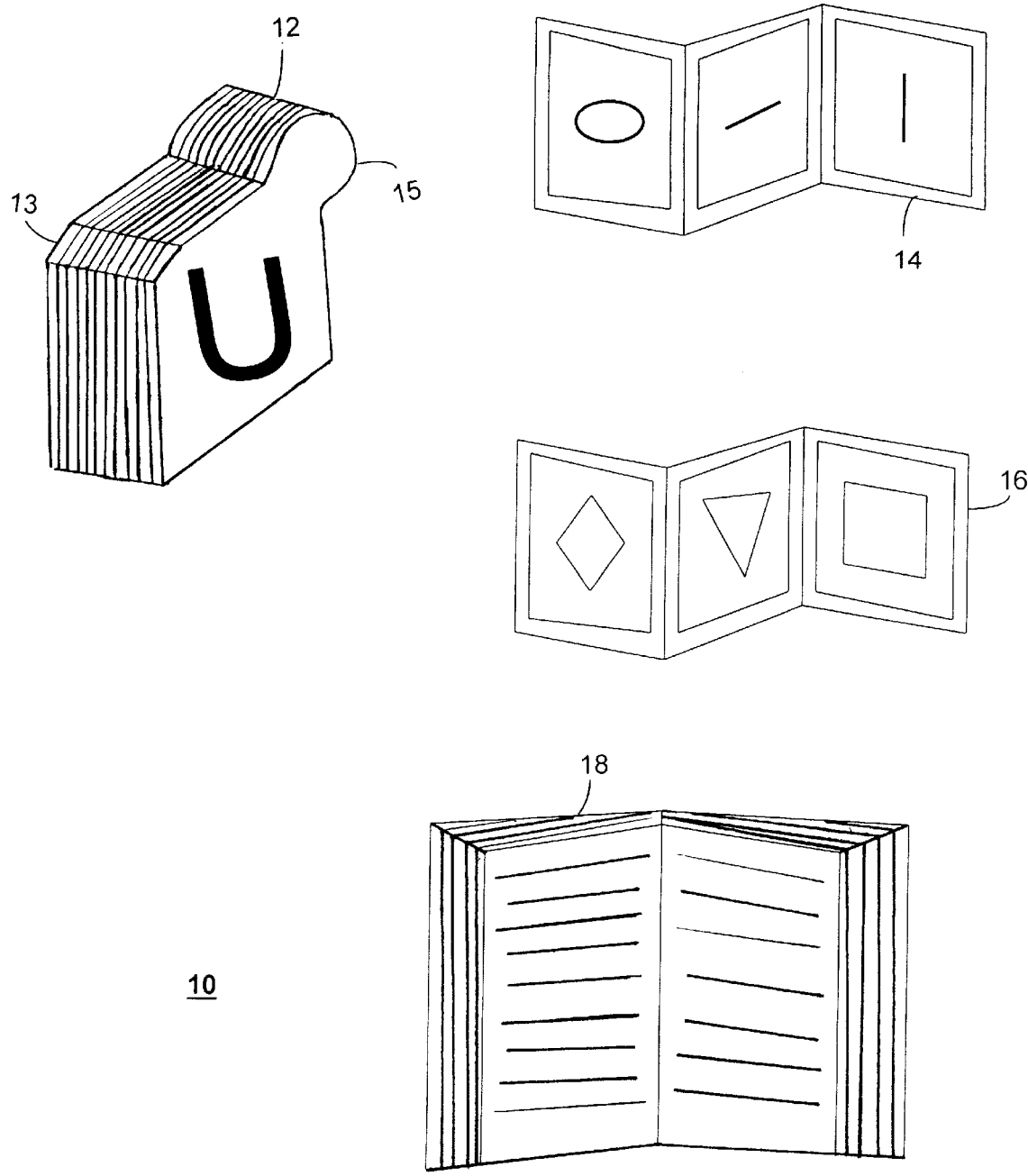
FIG. 1 illustrates an exemplary testing kit in accordance with one embodiment of the present invention.

Turning now to the drawings, and in particular to FIG. 1, there is illustrated a testing kit 10 in accordance with an embodiment of the present invention. The testing kit 10 includes a deck of specially designed cards 12, a first set of expandable cards 14, a second set of expandable cards 16, and a booklet 18 containing a protocol for administering the test.

The deck of cards 12 can include a plurality of separate cards, each having one or more predetermined symbols printed thereon. The cards 12 can include symbols on either side, and can be made of paper, cardboard, laminated cardboard, or any other material suitable for displaying printed symbols. The symbols displayed by the cards 12 can include letters, numbers, words, predefined shapes such as stars, hearts, or the like, and geometric shapes such as squares, rectangles, circles, triangles, or the like.

In addition, the cards can be color-coded to permit them to be easily sorted. This feature is especially important because it allows an examiner to quickly administer tests without overly distracting or boring the child while attempting to sort cards.

To further facilitate sorting, the cards 12 can be asymmetrically-shaped. The asymmetrical shape of the cards 12 is an advantage that permits the cards to be easily collected into a single stack, so that they maintain a common orientation, e.g., they are all right side up, front-side forward. In the example shown, the asymmetrical shape of the cards 12 is provided by a generally rectangular card having a clipped upper corner 13 and an ear 15 shaped as a circular tab extending from the opposite upper corner. Like the color coding, the asymmetrical shape reduces the distraction and delay normally associated with sorting.

Each card can display on its front side either a letter (A–Z) or a number (0–9). To reduce the number of cards in the set and improve their ease of use, various symbols, such as letters, words and geometric shapes are displayed on the backsides of the cards 12.

The card set 12 can include 36 cards organized into a plurality of subsets, where each subset is indicated by a respective card color. Each subset can be used to test a child's mastery of one or more particular tasks.

In a particular embodiment of the invention, the card set 12 includes five subsets. In this embodiment, a first subset having six red cards may be used to evaluate a child's ability to recognize letters in the alphabet. Each card in a first subset can display on its front side a letter from a predetermined group of letters. One or more letters from the group can be displayed on the back sides of individual cards in the subset. To facilitate testing activities relying on simultaneous viewing, such as those depicted in FIGS. 5–6, the letters appearing on the backsides can be inverted.

A second subset having nine yellow cards can be used to assess the child's ability to visually discriminate letters. Each card in the subset can display on its front a letter from a predetermined second group of letters. To enhance the convenience of using the cards, the words can be printed on the backs of respective ones of the cards. The words are composed of letters from the second group.

A third subset of cards comprising ten orange cards can be used to evaluate two different skills: (1) the child's knowledge of number facts and (2) the child's ability to recognize various shapes and colors. The front side of each card displays a particular digit (0–9), while the back side displays a geometric shape of a certain color.

A fourth subset comprising five green cards can be used to evaluate letter recognition skills, as well as comparison skills. The front side of each card in the fourth group can display a respective letter, while the back side can display columns having various lengths. To evaluate comparison skills, an examiner can ask questions about the columns.

A fifth subset of cards can include six grey cards, each displaying letters on the front side and repeated symbols on the backside. The repeated symbol can appear in various numbers, sizes and colors on the backs of the cards. The cards in the fifth subset can be used to evaluate both letter recognition skills and quantitative skills.

As will be discussed in greater detail below, the extendable sets of cards 14–16 permit simultaneous viewing of shapes that are to be copied by an examinee. Each expandable sets 14–16 can include three cards that are laminated together using clear plastic to form the foldable sets as shown.

The booklet 18 contains a protocol which lists instructions for administering the test. The protocol also includes a series of questions to be asked by the examiner, as well as a section or score card for recording the individual's answers to the questions. An example of the contents of the booklet 18 is provided in Appendix A. Although the protocol is shown in booklet form, it will be apparent that the protocol can be provided in other equivalent forms, such as loose-leaf, unbound papers, etc., without departing from the spirit and scope of the invention.

Figure 2:
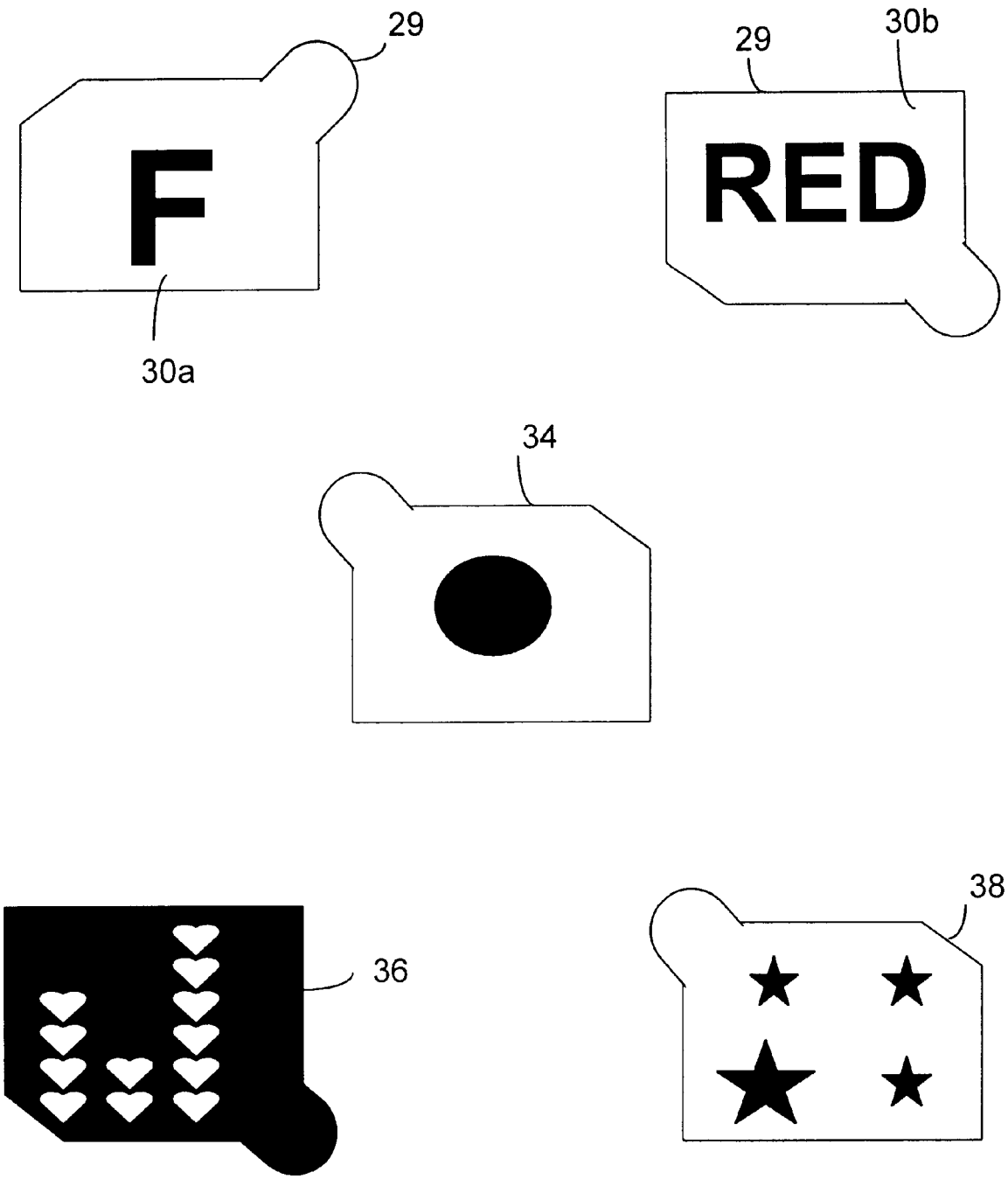
FIG. 2 illustrates examples of individual cards that can be included in the set of cards shown in FIG. 1.

Turning now to FIG. 2, there is illustrated some examples of the separate cards that can be included in the card set 12. The exemplary cards 30–38 show some of the various symbols that can be displayed by the deck of cards 12.

A first card 29 displays on its front-side 30a the letter "F", and displays on its back-side 30b the word "RED". The card 29 can be used to evaluate letter and word recognition skills, and can be included in the above-described first or second subsets. Letter cards, such as card 29, can also be used to measure the ability to match letters. The ability to match things, such as letters, is called visual discrimination.

A second card 34 illustrates an example of a card that can be included in the above-described third subset. The second card 34 displays a geometric shape on its backside. The shape shown is a circle; however, other shapes such as squares, rectangles, and triangles, or the like, can also be displayed on the backside of the number cards. The shapes can also appear in different colors. The front side of the card (not shown) typically displays a number. The backside of such a card can be used to test a child's ability to recognize shapes and colors, while the front side can test the child's ability to recognize numbers.

A third exemplary card 36 displays columns consisting of symbols shaped as hearts. The columns vary in length and are used to perform simple comparison tests, as will be discussed below. Any type of symbol can be used to depict a column, including a simple bar. Additionally, the columns can be also displayed horizontally instead of vertically. The card can also have a letter or number printed on its front side (not shown) so that it can be used to perform letter or number recognition tests. Cards such as the third card 36 can be included in the above-described fourth subset.

A fourth exemplary card 38 includes a plurality of repeated symbols appearing on its backside in various sizes and colors. Although a star is shown as an example of the repeated symbol, any distinct shape can be used. Cards displaying repeated symbols are used to evaluate a child's ability to make comparisons. The fourth card 38 can also display a letter or number on its front side (not shown) for use in letter or number recognition tests. The fourth card 38 can be included in the fifth subset described earlier.

Figure 3:
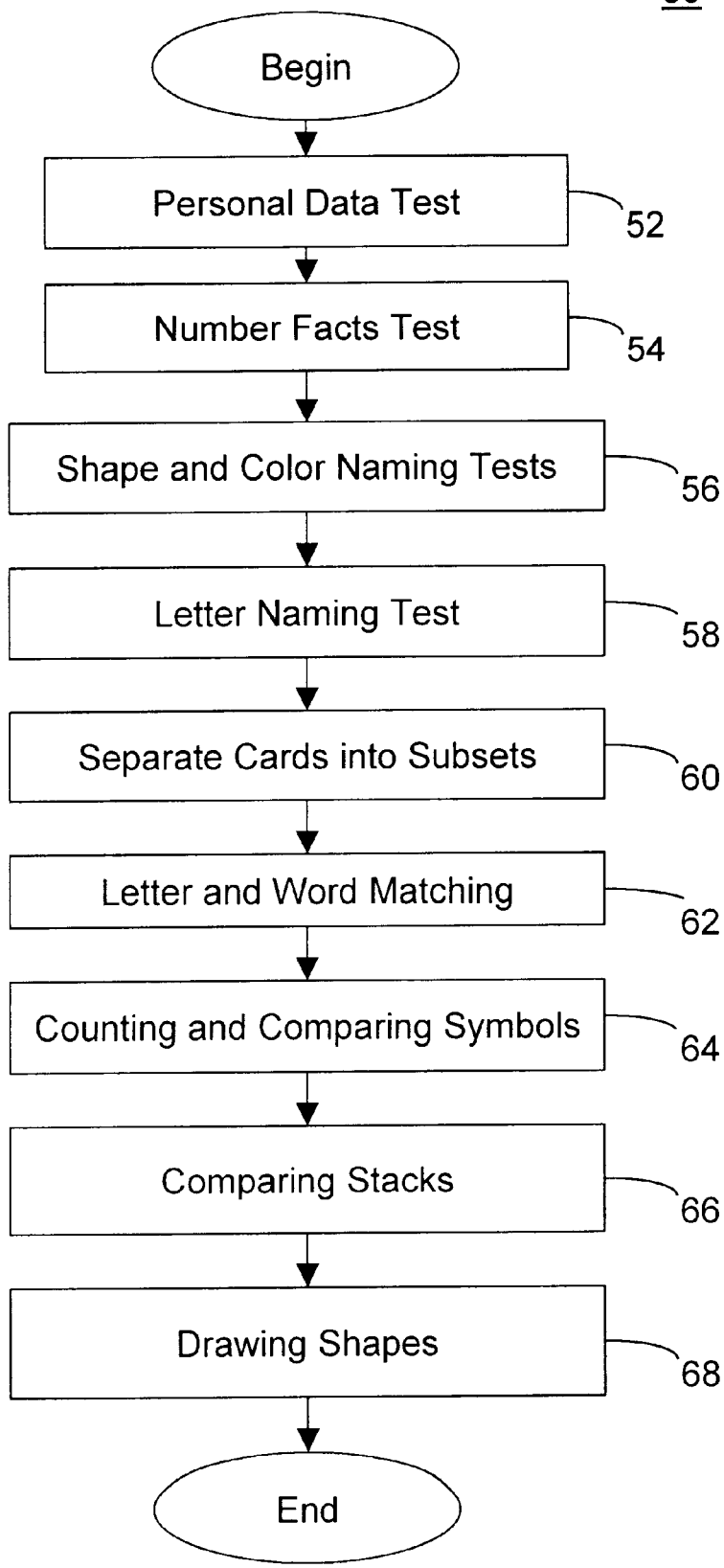
FIG. 3 is a flow diagram illustrating a method of assessing readiness skills of a child in accordance with another embodiment to the present invention.

FIG. 3 illustrates a flowchart diagram of a method 50 for assessing readiness skills of a child in accordance with an embodiment of the present invention. The protocol disclosed in the accompanying Appendix can be used as a source of specific information for carrying out the method 50.

In step 52, the testing specialist asks the child questions about personal data, such as a child's name, age, birth date, address, telephone, and the like. The child's answers are recorded and scored according to the protocol. For example, the child receives points for correctly stating his given name and points for identifying the month, day and year he was born.

In step 54, the child's knowledge of number facts is assessed. The test starts by asking the child to simply count from one and to continue until the testing specialist asks him/her to stop. The child is then asked to write numbers sequentially starting at the number one.

Figure 4:
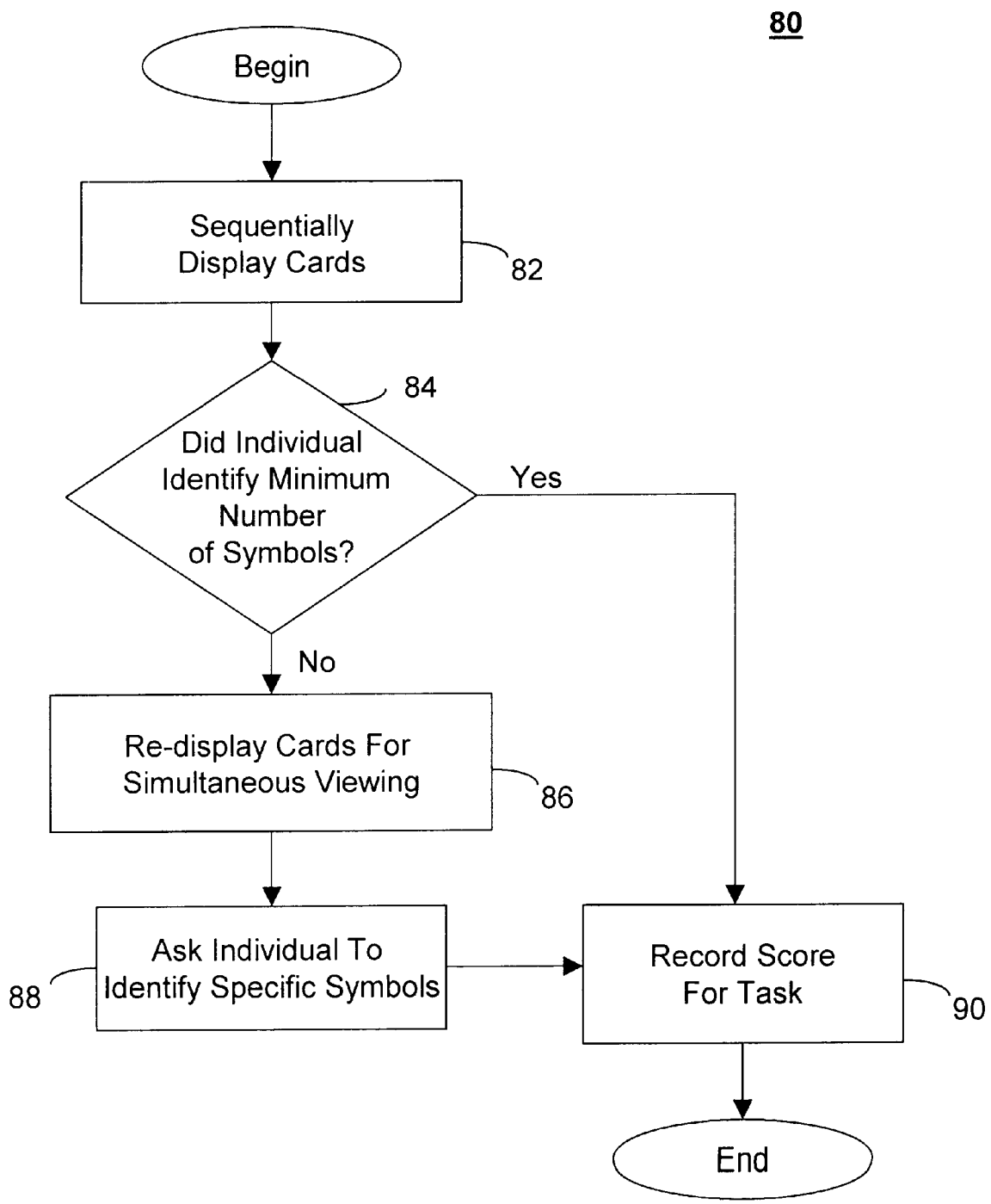
FIG. 4 is a flow diagram illustrating a method of performing various ones of the tests shown in FIG. 3 in accordance with a further embodiment of the present invention.

If the child exhibits difficulty in performing these tasks, the cards 12 can be used to further test the child's ability to recognize numbers. The procedure for performing this testing activity is illustrated by the flowchart 80 shown in FIG. 4. The procedure 80 is also used in other phases of the evaluation of the child's readiness skills.

To administer the number recognition test, a subset of the cards 12 is used, such as the third subset described earlier. The cards in the subset are sequentially presented in random order, one at a time, to the child (step 82). Each card displays a particular number, for example, a digit between 0 and 9. As each card is displayed, the testing specialist asks the child to identify the particular number. This is an expressive form of testing, i.e., a test which requires the child to say a response. The child's responses are recorded and scored according to the protocol. The testing specialist then determines whether the child correctly identified a minimally acceptable number of symbols (step 84). This minimal number can be established by statistics gathered on children of similar age, responding to the same task. It is well established that children at a specific age, collectively, should have mastery of certain pre-academic kills. Accordingly, statistical distributions of prior responses can provide reliable criteria for screening children with possible learning problems. If the number of correct responses does not satisfy a predetermined criteria, a remedial testing activity is then performed with the cards (steps 86–88).

Figure 5:
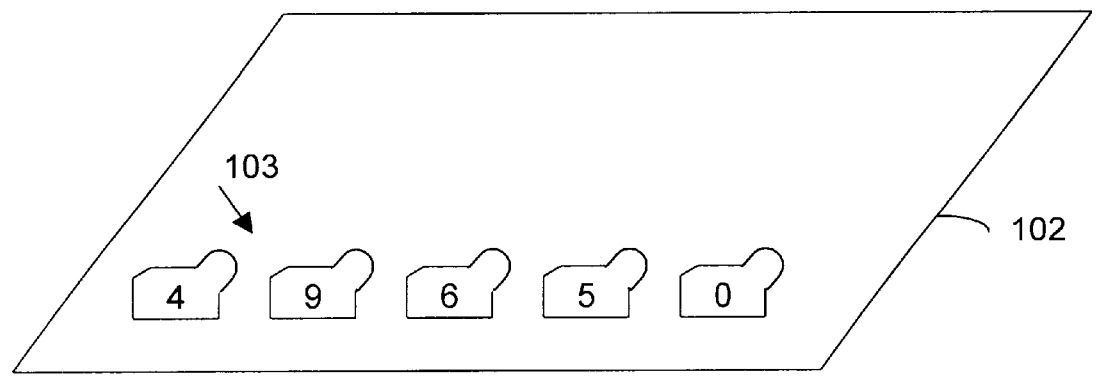
FIG. 5 illustrates a subset of the cards of FIG. 1 being displayed for simultaneous viewing.
Figure 6:
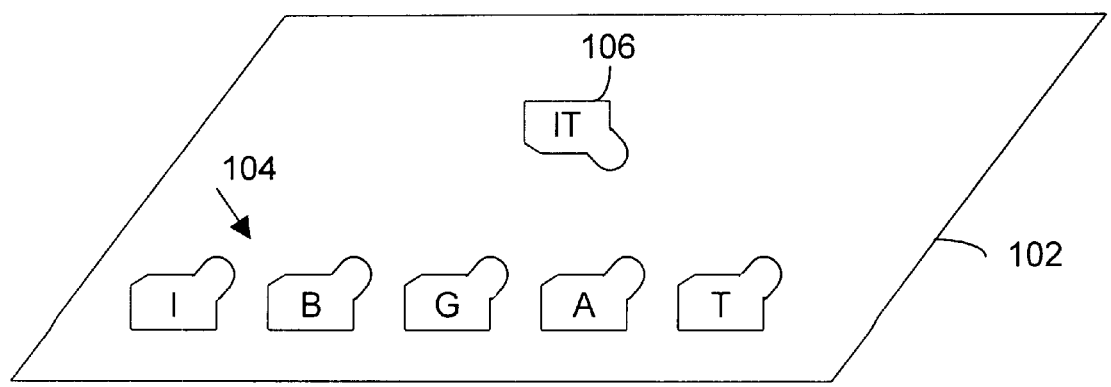
FIG. 6 illustrates a subset of cards displayed in an alternative manner for simultaneous viewing.

The remedial testing activity presents test information to the child in an alternative manner, permitting a receptive form of testing. In contrast, to expressive testing, receptive testing requires the child to point rather than speak. To perform a receptive-type test, the cards are displayed for simultaneous viewing as shown in FIG. 5 (step 86). The cards 104 are placed front-side up on a flat surface 102, to display their symbols (in this case numbers). The child is then asked to identify each of the displayed numbers. This is accomplished by simply asking the child to point to a card displaying a particular number. For instance, asking the child to point to the card with the number "5" on it. After asking the child to identify each number, a score is recorded for the task (step 90).

Referring again to FIG. 3, the child's ability to identify geometric shapes and colors is evaluated after performing the number test (step 56). The procedure 80 shown in FIG. 4 for administering expressive and, if necessary, receptive tests can be used to concurrently evaluate both shape and color-naming skills. This is accomplished by providing a subset of cards where each card displays a different shape having a particular color, such as the third subset described earlier. As the cards are sequentially displayed (step 82), the testing specialist asks the child to identify the shape, and then irrespective of the child's answer, proceeds to ask the child to identify the shape's color. If the receptive testing activity (steps 86–88) is necessary, the testing specialist can likewise assess the child's ability to name shapes and colors by displaying the cards in the manner shown in FIG. 5 and asking the child to identify each of the displayed shapes and colors.

In step 58, a letter-naming test is administered to evaluate the child's knowledge of the alphabet. In the exemplary set of cards described in FIG. 1, four of the five subsets are used in this test (the third subset is not used because it only displays numbers and shapes). Each card in the four subsets displays on its front side a particular letter of the alphabet. The test is administered using the procedure 80 shown in FIG. 4, with the added caveat that as the cards are being sequentially displayed (step 82), they are separated into their respective subsets according to color (step 60). This conveniently readies the subsets for subsequent tests without unduly distracting the child. If receptive testing is required (step 84), the testing specialist performs steps 86–90, as described earlier for steps 54–56, using one or more of the four subsets.

In step 62, letter and word matching tests (visual discrimination tests) are administered to evaluate the child's ability to form simple words. To perform the visual discrimination tests, a subset of the cards, such as the first or second subsets described earlier, is displayed as shown in FIG. 6. As shown, all but one of the cards 104 in a subset are displayed front-side up, revealing their individual letters. One card 106 in a subset is placed back-side up to display either a letter or a word composed of the letters displayed by the other cards 104 in the subset. The child is then asked to select from the front-side up cards 104 the letter(s) displayed by the back-side up card 106. The child's responses are then scored according to the protocol.

Next, in step 64, the child's ability to count and compare abstract symbols is tested. To evaluate the child's ability to perform this task, a subset of cards is displayed in sequence to the child. The subset can be the above-described fifth subset and can comprise a plurality of cards similar to the fourth card 38 shown in FIG. 2. Each card in the sequence displays one or more abstract symbols, such as a star. The symbol can appear in various numbers, sizes or colors. For each card in the sequence, the child can be asked to identify the number of symbols appearing thereon. In addition, the child can be asked to identify various characteristics of the symbols by comparing them to one another. For instance, for some cards, the child will be asked to identify the largest star or the smallest star, stars that appear the same or have the same color or size, or the order of appearance of the symbol such as first, middle or last.

In step 66, the child's ability to distinguish the size of objects is evaluated by comparing stacks or columns appearing on a subset of the cards, such as the above-described fourth subset. An example of such a card is shown in FIG. 2 as the third card 36. Each card in the subset has a different configuration of columns varying in number and height. The cards are sequentially displayed to the child, and as each card is displayed, the child can be asked to identify characteristics by comparing the stack characteristics derived by comparing the stacks, which is the tallest/biggest or the shortest/smallest, which appears first, which appears last, which one is in the middle.

In step 68, the child's ability to draw a simple geometric shape is evaluated using the expandable sets of cards 14–16. The task of drawing exhibits the child's readiness for learning to write. To evaluate the child's ability to perform this task, each of the expandable sets 16–18 is expanded, in turn, to display before the child the shape appearing on each card. A piece of paper is then placed before the expanded set. The child is then given a writing instrument, such as a pen or pencil, and asked to copy each of the displayed symbols on the paper.

While specific embodiments of the present invention have been shown and described, it will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. An apparatus for assessing the skills of an individual, comprising:

a plurality of asymmetrically-shaped cards each displaying on the front side thereof a symbol selected from a group consisting of letters and numbers, the cards being organized into a plurality of subsets, each subset being indicated by a respective card color, the subsets including a first subset of cards displaying a first group of letters on the front sides thereof and displaying at least one letter of the first group on the back side of at least one of the cards in the first subset, a second subset of cards displaying a second group of letters on the front sides thereof and displaying at least one word on the back side of at least one of the cards in the second subset, the word being composed from a plurality of letters in the second group, a third subset of cards displaying various shapes on the back sides thereof, a fourth subset of cards displaying a plurality of columns on the back sides thereof, and a fifth subset of cards having a single repeated symbol appearing on the backsides thereof in various quantities, colors and sizes.

2. The apparatus of claim 1, further comprising an expandable set of cards.

3. The apparatus of claim 1, further comprising:

instructions for displaying the cards to the individual in a predetermined manner.

4. The apparatus of claim 1, further comprising:

a protocol including a list of questions to be asked to the individual about the cards.

5. The apparatus of claim 4, further comprising:

a scorecard for recording the individual's responses to the questions.

6. An apparatus for assessing the skill of an individual, comprising:

a plurality of asymmetrically-shaped cards being organized into a plurality of subsets, each subset being indicated by a respective color in order to facilitate separating the cards into their respective subsets, the subsets including a first subset of cards displaying a first group of letters on the front sides thereof and displaying at least one letter of the first group on the back side of at least one of the cards in the first subset, and a second subset of cards displaying a second group of letters on the front sides thereof and displaying at least one word on the back side of at least one of the cards in the second subset, the word including a plurality of letters included in the second group.

7. The apparatus of claim 6, wherein the plurality of subsets further includes a third subset of cards displaying various shapes on the back sides thereof.

8. The apparatus of claim 6, wherein the plurality of subsets further includes a fourth subset of cards displaying a plurality of columns on the back sides thereof.

9. The apparatus of claim 6, wherein the plurality of subsets further includes a fifth subset of cards having at least one card displaying a repeated symbol.

10. The apparatus of claim 9, wherein the repeated symbol appears in various sizes.

\* \* \* \* \*